UNITED STATES PATENT OFFICE.

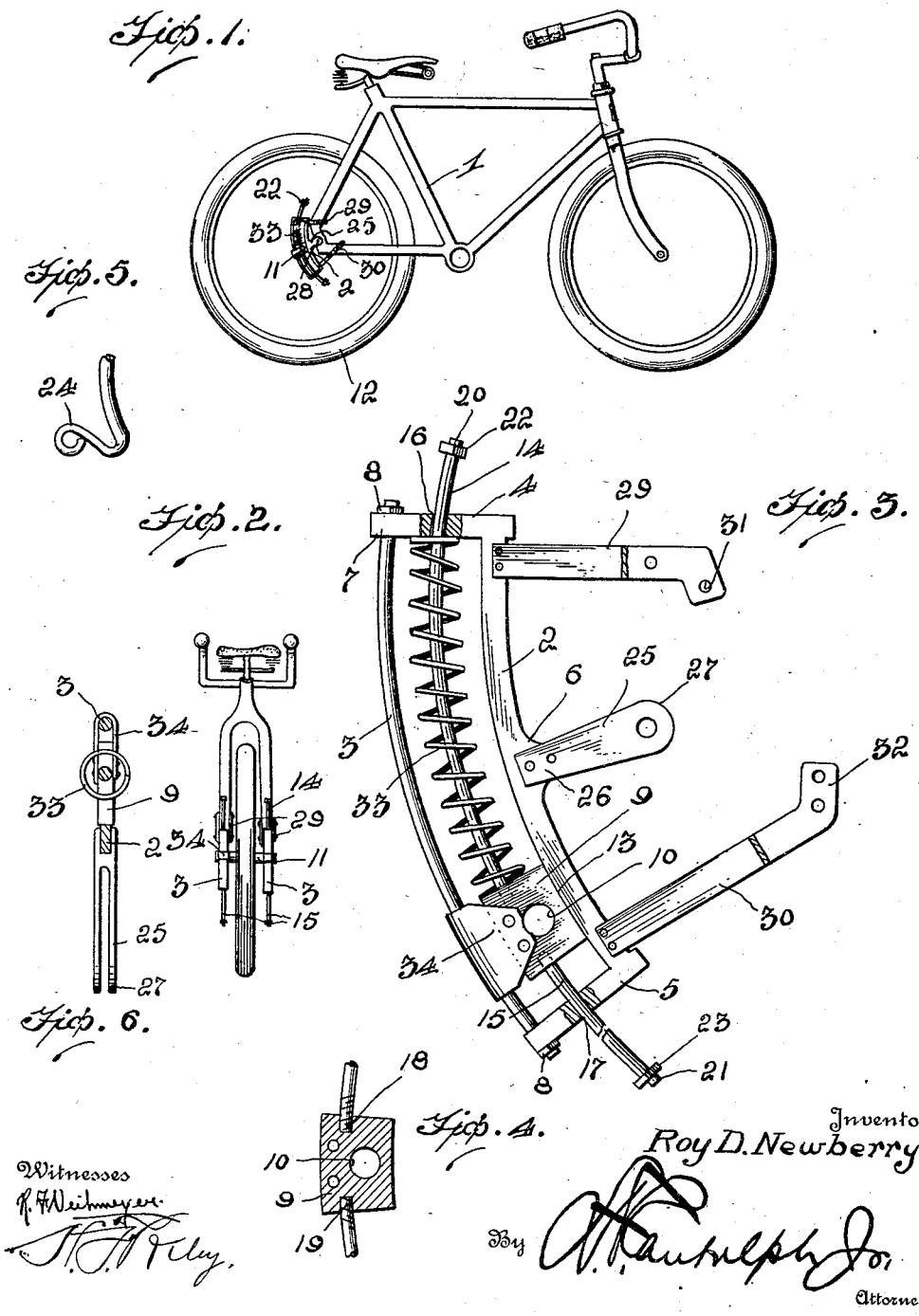

ROY D. NEWBERRY, OF BRONTE, TEXAS.

SHOCK-ABSORBER FOR BICYCLES AND MOTOR-CYCLES.

1,275,460. Specification of Letters Patent. Patented Aug. 13, 1918.

Application filed October 16, 1915. Serial No. 56,290.

*To all whom it may concern:*

Be it known that I, ROY D. NEWBERRY, a citizen of the United States, residing at Bronte, in the county of Coke and State of Texas, have invented certain new and useful Improvements in Shock-Absorbers for Bicycles and Motor-Cycles; and I do hereby declare the following to be a full, clear, and exact description of the invention, such as will enable others skilled in the art to which it appertains to make and use the same.

The invention relates to a shock absorbing attachment for bicycles and motor-cycles.

The object of the present invention is to provide a simple, practical and inexpensive device adapted to be readily applied to motorcycles and bicycles and capable of absorbing the shocks and jars and increasing the life of a bicycle or motorcycle and of enabling the engine of the latter to run smoother and at the expenditure of less power.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawing

Figure 1 is a side elevation of a bicycle provided with an attachment constructed in accordance with this invention, Fig. 2 is an end elevation of a bicycle showing the attachment at opposite sides thereof.

Fig. 3 is an enlarged detail view of the attachment,

Fig. 4 is a detail sectional view illustrating the manner of connecting the upper and lower rods with the relatively slidable bearing, Fig. 5 is a detail view of the lower left hand rod illustrating the construction for connecting a coaster brake to the attachment.

Fig. 6 is a transverse sectional view through one of the cushioning devices.

Like numerals of reference designate corresponding parts in all the figures of the drawings.

In the accompanying drawing in which is illustrated the preferred embodiment of the invention, the attachment which is shown applied to the frame 1 of a bicycle at opposite sides thereof comprises in its construction, an arcuate guide frame composed of spaced front and rear sides 2 and 3 and connecting ends 4 and 5 arranged at the top and bottom of the frame. The ends 4 and 5 are preferably formed integral with front side 2 which consists of a curved bar provided with a central enlargement or lug 6. The rear side 3 preferably consists of a curved rod having its terminals threaded and extended through perforations 7 in the ends 4 and 5 of the frame and secured to the same by nuts 8 which engage the threaded ends of the rod or side 3. The arcuate guide frame receives a relatively slidable bearing block 9 provided with a bearing opening 10 for the reception of the axle 11 of the rear wheel 12 of the bicycle. The bearing block 9 has a curved front edge 13 which fits against the curved inner or rear edge of the front side 2 of the arcuate frame and is slidable along the same.

The guide block is supported and held against lateral movement by upper and lower rods 14 and 15 extending through openings 16 and 17 in the ends 4 and 5 of the guide frame. These rods 14 and 15 have threaded inner ends 18 and 19 which are screwed into sockets or openings in the upper and lower ends of the bearing block 9 as clearly illustrated in Fig. 4 of the drawing. The outer ends of the upper and lower rods of the device at the right hand side of the bicycle are threaded at 20 and 21 for the reception of upper and lower nuts 22 and 23 and the lower end of the lower rod at the left hand side of the bicycle is provided with an arm 24. The arm 24 which is formed by bending the rod upwardly and rearwardly is adapted to be connected with the arm of a coaster brake but when this is unnecessary both of the lower rods of the two devices may be threaded and provided at their lower ends with nuts.

The device is attached to the frame of the bicycle by a central clamp 25 consisting of an arm or body having bifurcated ends to straddle the lug 6 and the adjacent portion of the frame of the bicycle. The bifurcated inner or rear end 26 is riveted or otherwise secured to the lug 6 and the sides or portions 27 embrace the adjacent portion of the bicycle frame and are secured to the same by a transverse bolt 28. The device is braced and maintained in a rigid relation with the frame of a bicycle by means of upper and lower bracing arms 29 and 30 riveted or otherwise secured at their inner or rear ends to the frame of the device and provided at their front ends with attaching portions 31 and 32 set at an angle and secured to the frame of the bicycle. The angularly disposed attaching portions 31 and 32 are bifurcated to embrace the bars of the frame 1 and are secured to the same by bolts or other suitable fastening means. By this construction the frame may be quickly attached to the frame of a bicycle without requiring special tools. The upper rod 14 has disposed on it a coiled cushioning spring 33 interposed between the end 4 at the top of the guide frame and the upper edge of the slidable bearing block and adapted to yieldably support the rear portion of the frame of the bicycle and adapted to absorb the shocks and jars and thereby increase the spring action of both the tire of the wheel and spring of the seat. This enables the riding of bicycles and motorcycles to be much easier on both the machine and the person and the life of the machine is materially increased. At the same time the engine of a motorcycle is caused to run smoother and the propulsion of the motorcycle is less hard on the engine.

The slidable bearing block is also guided in the opening of the arcuate guide frame by means of a clip 34 of approximately U-shape slidably embracing the rear rod or side 3 of the guide frame and having its sides riveted or secured to the bearing block in the rear of the bearing opening 10.

What is claimed is:—

An attachment of the class described comprising a frame, said frame having an arcuate bar, outwardly extending end members formed integrally with each end of the bar and provided with central apertures, an arcuate rod having its ends removably secured to the free terminals of the end members of the bar, a bearing block slidably fitted against the inner side of the arcuate bar and provided with a central aperture adapted to receive the axle of a rear wheel, an arcuate rod slidably fitted through each opening of each end member of the bar, the inner end of each arcuate rod being screw threaded and fitted into the opposite ends of the bearing block, means on the outer end of each rod for limiting the movement of the rods with relation to the end members of the bar, a coiled spring surrounding one of said rods and bearing against the block and one end member, and a guide secured to the opposite side faces of the bearing block and embracing the first named arcuate rod to guide the bearing block in its movement in the frame.

In testimony whereof I affix my signature in presence of two witnesses.

ROY D. NEWBERRY.

Witnesses:
C. T. BRASHEARS,
W. S. GRIMES.